(12) United States Patent
Ichikawa

(10) Patent No.: US 9,350,883 B2
(45) Date of Patent: May 24, 2016

(54) COLOR/MONOCHROMATIC DETERMINATION

(71) Applicant: CANON KABUSHIKI KAISHA, Tokyo (JP)

(72) Inventor: Masanori Ichikawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 30 days.

(21) Appl. No.: 14/078,708

(22) Filed: Nov. 13, 2013

(65) Prior Publication Data

US 2014/0133747 A1 May 15, 2014

(30) Foreign Application Priority Data

Nov. 14, 2012 (JP) ................. 2012-250182

(51) Int. Cl.
*G06K 9/00* (2006.01)
*H04N 1/00* (2006.01)
*H04N 1/32* (2006.01)

(52) U.S. Cl.
CPC ......... *H04N 1/0005* (2013.01); *H04N 1/32128* (2013.01); *H04N 2201/325* (2013.01); *H04N 2201/3226* (2013.01); *H04N 2201/3242* (2013.01); *H04N 2201/3256* (2013.01)

(58) Field of Classification Search
CPC ............ H04N 1/00005; H04N 1/0005; H04N 1/4092; H04N 1/41; H04N 1/56; H04N 1/60; H04N 1/6058; H04N 1/6072; H04N 1/642; G06T 5/20; G06T 7/408; G06T 9/00; G06T 9/005; G06T 2207/10008; G06T 2207/30176
See application file for complete search history.

(56) References Cited

U.S. PATENT DOCUMENTS

| | | | | |
|---|---|---|---|---|
| 5,198,898 A | * | 3/1993 | Miyata | 358/500 |
| 5,287,204 A | * | 2/1994 | Koizumi et al. | 358/538 |
| 5,353,132 A | * | 10/1994 | Katsuma | 358/539 |
| 5,363,218 A | * | 11/1994 | Hoshino | 358/518 |
| 5,838,455 A | * | 11/1998 | Imaizumi et al. | 358/3.1 |
| 6,198,841 B1 | * | 3/2001 | Toyama et al. | 382/164 |
| 7,925,083 B2 | * | 4/2011 | Johnson | 382/162 |
| 2006/0044576 A1 | * | 3/2006 | Tabata et al. | 358/1.9 |

FOREIGN PATENT DOCUMENTS

JP 2012-32668 A 2/2012

* cited by examiner

*Primary Examiner* — Jose Couso
(74) *Attorney, Agent, or Firm* — Canon U.S.A., Inc. IP Division

(57) ABSTRACT

An apparatus includes a compression unit configured to compress an image, and a determination unit configured to determine whether the image before the compression is color or monochromatic based on a data size of the image after the compression.

13 Claims, 10 Drawing Sheets

FIG.6

TILE DATA

| MCU 1 | MCU 2 | MCU 3 | MCU 4 |
|---|---|---|---|
| MCU 5 | MCU 6 | MCU 7 | MCU 8 |
| MCU 9 | MCU 10 | MCU 11 | MCU 12 |
| MCU 13 | MCU 14 | MCU 15 | MCU 16 |

FIG.7

QUANTIZATION TABLE 4

QUANTIZATION TABLE 3 — FOR COLOR DIFFERENCE VALUE

QUANTIZATION TABLE 2 — FOR LUMINANCE VALUE

QUANTIZATION TABLE 1

FOR LUMINANCE VALUE

| 4 | 4 | 6 | A | A | 10 | 14 | 18 |
|---|---|---|---|---|----|----|----|
| 5 | 6 | 8 | A | A | 17 | 18 | 1C |
| 5 | 6 | 6 | A | C | 10 | 17 | 1C |
| 6 | 7 | 9 | C | 14 | 23 | 20 | 19 |
| 7 | 9 | F | 16 | 1B | 2C | 29 | 1F |
| A | E | 16 | 1A | 20 | 2A | 2D | 25 |
| 14 | 1A | 1F | 23 | 29 | 28 | 30 | 28 |
| 1D | 25 | 26 | 27 | 30 | 28 | 28 | 28 |

FOR COLOR DIFFERENCE VALUE

| 7 | 7 | A | A | 13 | 28 | 28 | 28 |
|---|---|---|---|----|----|----|----|
| 7 | 8 | A | 16 | 1A | 28 | 28 | 28 |
| A | A | 16 | 28 | 28 | 28 | 28 | 28 |
| 13 | 1A | 28 | 28 | 28 | 28 | 28 | 28 |
| 28 | 28 | 28 | 28 | 28 | 28 | 28 | 28 |
| 28 | 28 | 28 | 28 | 28 | 28 | 28 | 28 |
| 28 | 28 | 28 | 28 | 28 | 28 | 28 | 28 |
| 28 | 28 | 28 | 28 | 28 | 28 | 28 | 28 |

FIG.8

COLOR SIZE DETERMINATION
THRESHOLD VALUE TABLE

| QUANTIZATION ID | COLOR SIZE DETERMINATION THRESHOLD VALUE |
|---|---|
| 00 | 235 |
| 01 | 176 |
| 10 | .... |
| 11 | .... |

COLOR/MONOCHROMATIC DETERMINATION

BACKGROUND OF THE INVENTION

1. Field of the Invention

The present invention relates to color/monochromatic determination.

2. Description of the Related Art

Conventionally, regarding image forming apparatuses such as a multifunction peripherals, there is known a technique which determines whether a page of an input image is a color page based on color/monochromatic determination for each pixel of the input image. When the number of pixels determined as color pixels exceeds a predetermined number, the page is determined as a color page.

According to the above-described method, however, since the color/monochromatic determination is performed for all the pixels in one page, the determination takes time.

Thus, Japanese Patent Application Laid-Open No. 2012-32668 discusses a method by which a thumbnail image is generated by reducing an input image of one page. Then, whether the page is color or monochromatic is determined with respect to each pixel of the thumbnail image.

SUMMARY OF THE INVENTION

According to an aspect of the present invention, an apparatus includes a compression unit configured to compress an image and a determination unit configured to determine whether the image before the compression is color or monochromatic based on a data size of the image after the compression and a mean color difference value of the image before the compression.

Further features of the present invention will become apparent from the following description of exemplary embodiments with reference to the attached drawings.

BRIEF DESCRIPTION OF THE DRAWINGS

FIG. 6 is a schematic diagram illustrating a relation between tile data and a MCU according to the exemplary embodiment of the present invention.

FIG. 7 is a schematic diagram of a quantization table according to the exemplary embodiment of the present invention.

FIG. 8 is a table of color size determination threshold values according to the exemplary embodiment of the present invention.

DESCRIPTION OF THE EMBODIMENTS

Various exemplary embodiments, features, and aspects of the invention will be described in detail below with reference to the drawings. A multifunction peripheral (MFP) such as a digital multifunction peripheral having a plurality of functions such as scanning, printing, and copying is described below as an example of an image forming apparatus according to an exemplary embodiment of the present invention.

Figure 1:
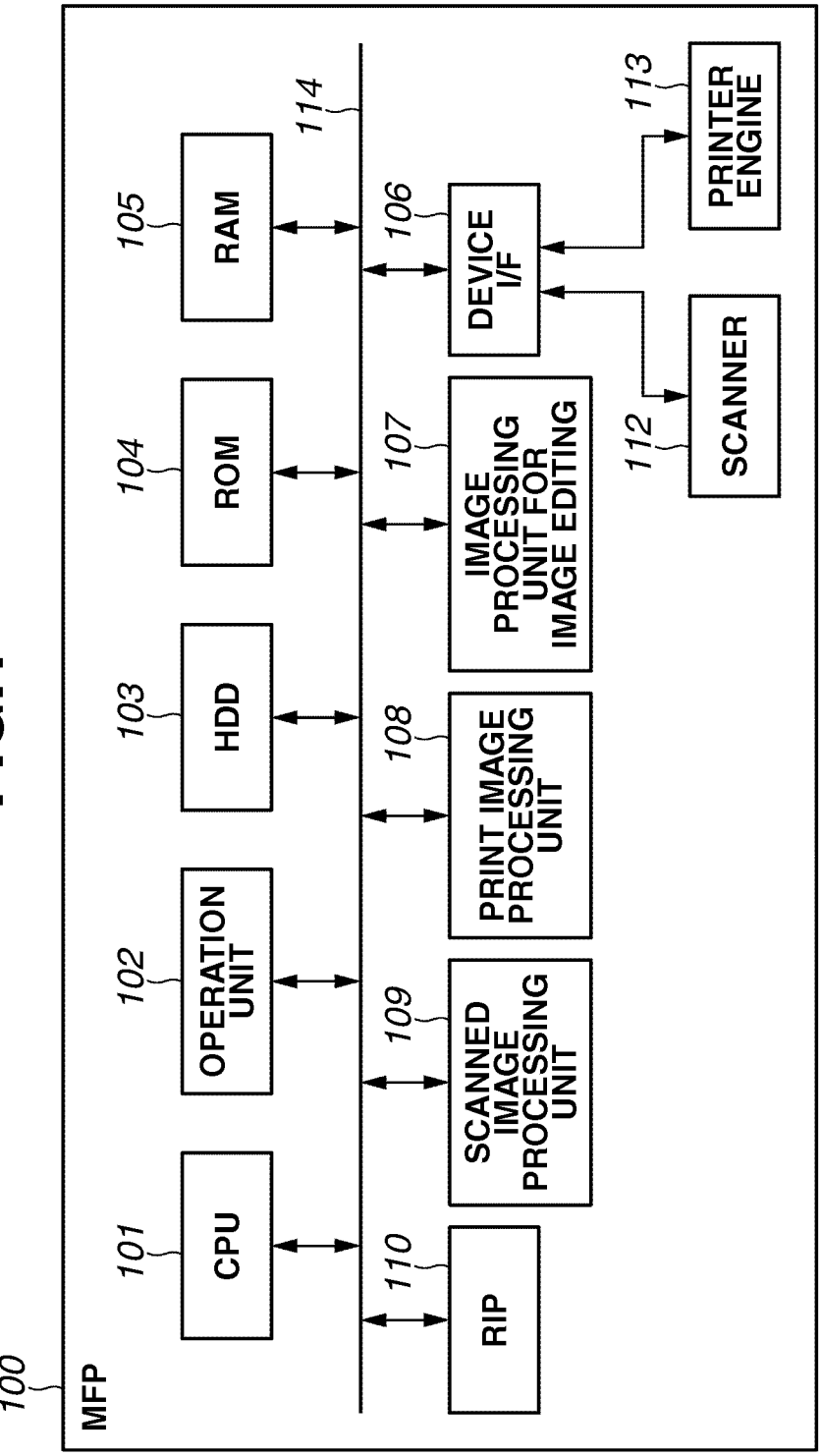
FIG. 1 is a block diagram of an image processing apparatus according to an exemplary embodiment of the present invention.

FIG. 1 is a block diagram of an overall configuration of an MFP 100 as the image forming apparatus according to the present embodiment. In FIG. 1, a scanner 112, which is an image input device, and a printer engine 113, which is an image output device, are connected inside the MFP 100. The MFP 100 performs control on the scanner 112 and the printer engine 113 for reading and printing image data, respectively.

A central processing unit (CPU) 101 controls the MFP 100. An operation unit 102 receives an operation instruction from a user and displays an operation result. A hard disk drive (HDD) 103 stores system software used for various types of processing and image data which has been input. A read-only memory (ROM) 104 is a boot ROM and stores a boot program for a system. A random access memory (RAM) 105 is a system work memory used for the operation of the CPU 101 and also serves as an image memory which temporary stores image data which has been input. A device I/F 106 is connected with the scanner 112 and the printer engine 113 and performs transfer processing of image data. An image processing unit for image editing 107 performs various types of image processing. The processing is, for example, rotating, scaling, color processing, cropping/masking, binary conversion, multivalued conversion, and blank sheet determination of image data. A print image processing unit 108 performs image processing and image correction of the image data to be printed according to the printer engine 113. A scanned image processing unit 109 performs various types of processing such as correcting, processing, and compressing of the image data read by the scanner 112. A raster image processor (RIP) 110 rasterizes a page description language (PDL) code received via a network I/F (not illustrated) into image data. The above-described units are connected to a system bus 114.

Figure 2:
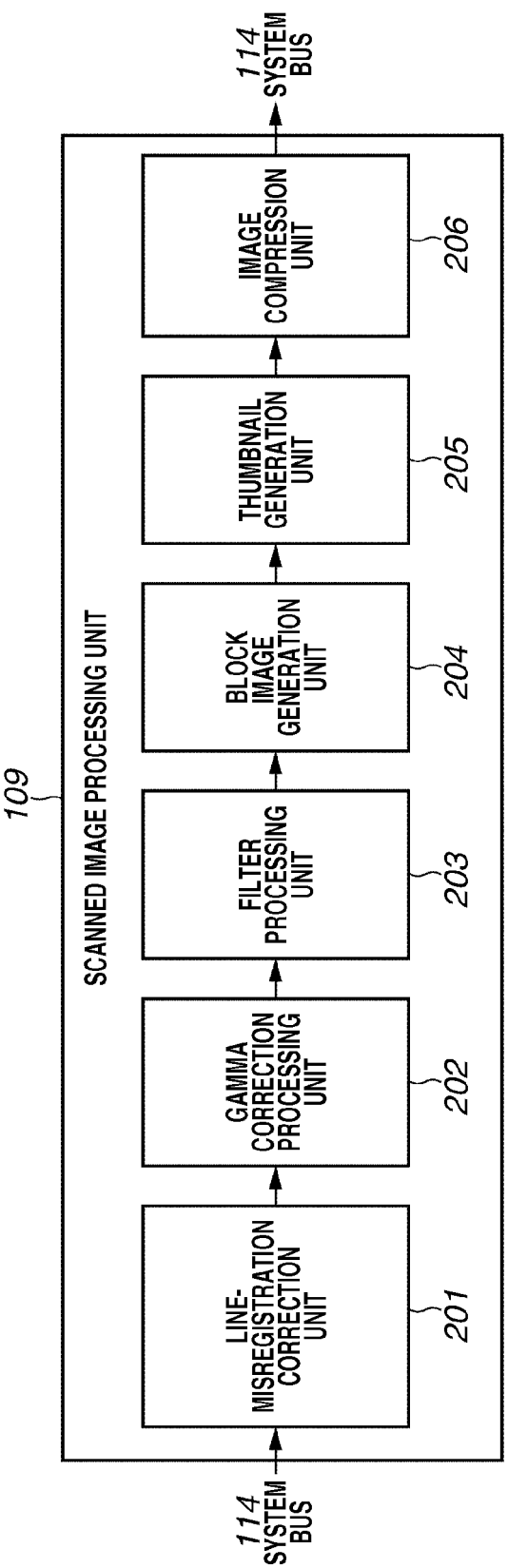
FIG. 2 is a block diagram of a scanned image processing unit according to the exemplary embodiment of the present invention.
Figure 3:
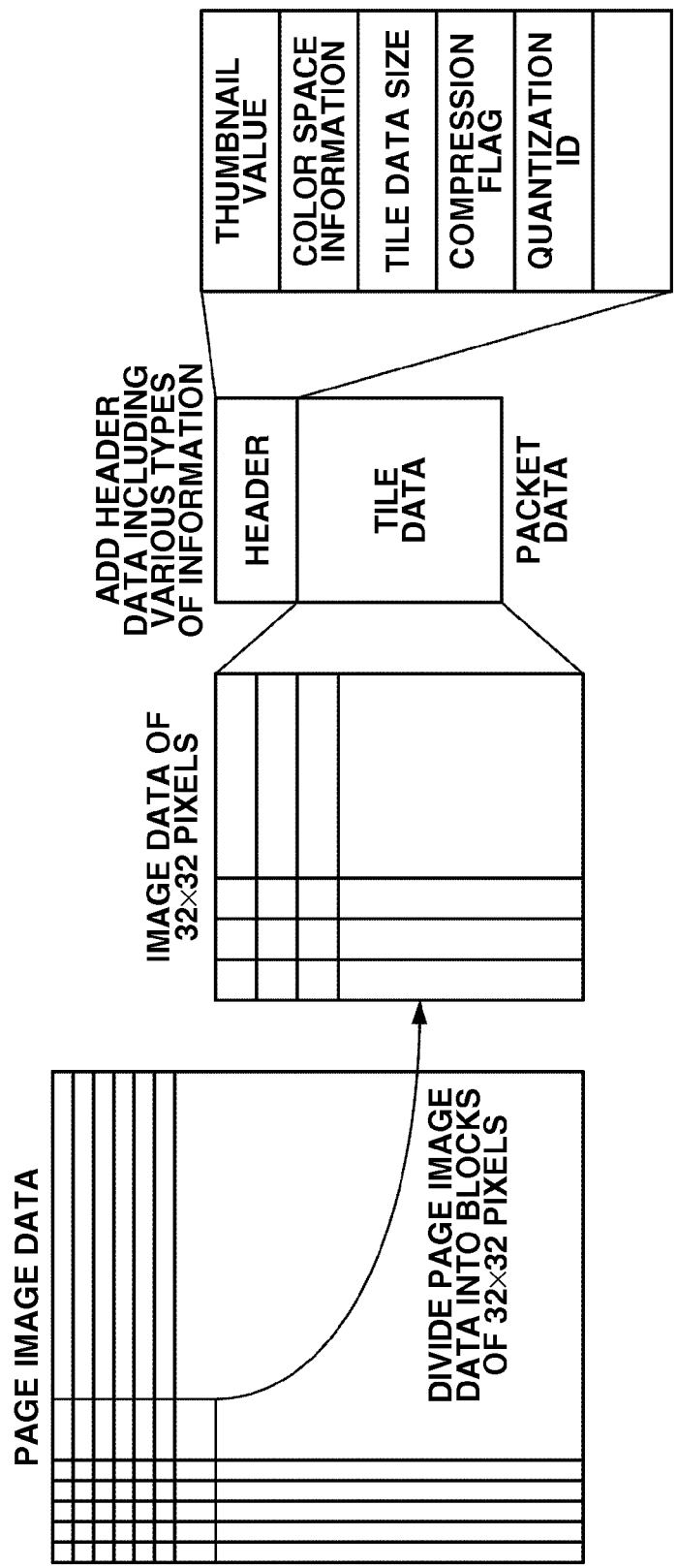
FIG. 3 is a schematic diagram illustrating a configuration of packet data according to the exemplary embodiment of the present invention.

FIG. 2 is a block diagram of an inner configuration of the scanned image processing unit 109 provided in the image forming apparatus according to the present embodiment. A line-misregistration correction unit 201 corrects misregistration between components in line units in a sub-scanning direction of the RGB image data obtained from the scanner 112. A gamma correction processing unit 202 performs color correction so that a tint of image data which depends on the scanner 112 is corrected to a common tint by the digital multifunction peripheral. A filter processing unit 203 performs filter processing such as smoothing. A block image generation unit 204 generates block image data of 32×32 pixels from the image data which has been input in raster format. Further, the block image generation unit 204 generates data having header data of a predetermined fixed length added to tile data as illustrated in FIG. 3. It is also useful to provide a color conversion processing unit (e.g., a color conversion processing unit which converts a RGB image into a YUV image) between the filter processing unit 203 and the block image generation unit 204. According to the present embodiment, although a RGB image is converted into a YUV image, such conversion is not necessarily performed.

Figure 9:
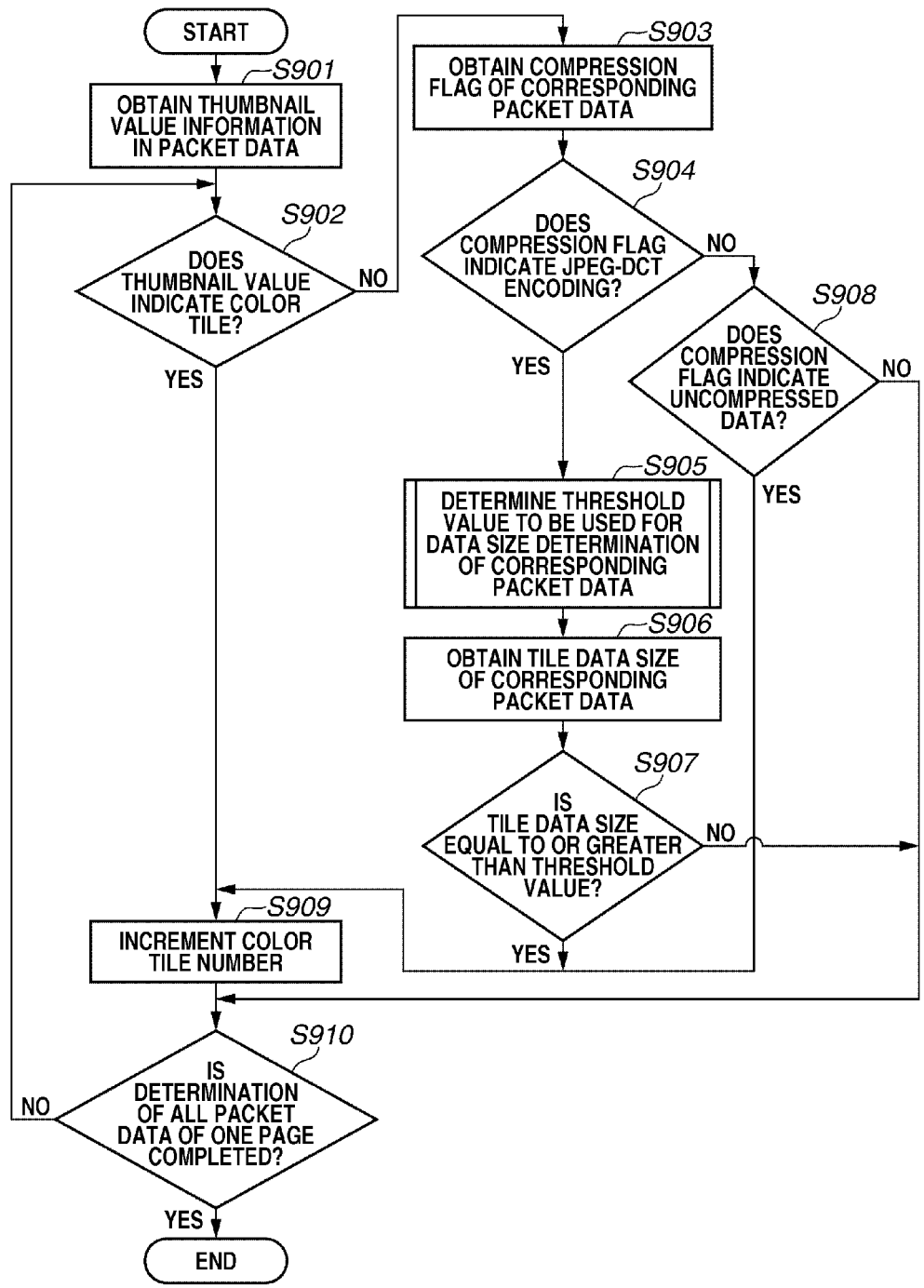
FIG. 9 is a flowchart illustrating processing for calculating a number of color tiles on one page according to the exemplary embodiment of the present invention.

The processing flow is as follows. When a copy instruction is forwarded from the operation unit 102, the scanner 112 scans a document. The result of the scanning is transferred to the scanned image processing unit 109 via the device I/F 106 and the system bus 114. Then, the scanned image processing unit 109 performs the processing illustrated in FIG. 2. The result of the processing (e.g., packet data including compressed YUV image data) is stored in the RAM 105 via the system bus 114. Then, the processing illustrated in FIG. 9 is performed. When the processing illustrated in FIG. 9 is finished, the CPU 101 sends the result input in the RAM 105 to the print image processing unit 108 via the system bus 114. Then, the print image processing unit 108 retrieves compressed YUV image data from the packet data and decompresses the YUV image data. Then, the print image processing unit 108 converts the decompressed result (YUV image data in tile data format) into YUV image data in raster data format, and further converts the converted data into image data in CMYK image data or K (monochromatic) image data. Further, the print image processing unit 108 performs halftone processing with regard to the obtained image data. The obtained result of the halftone processing is transferred to the printer engine 113 via the system bus 114 and the device I/F 106. Then, the printer engine 113 prints the result of the halftone processing.

Although a series of the processing flow is described above in the case of copy operation, the processing flow can be applied to operations other than the copy operation. For example, in a case of PDL printing, PDL data sent from an external apparatus is converted into raster image data by the RIP 110, and the result of the conversion is subjected to the processing illustrated in FIG. 2. In the following description, an image of one page is referred to as an input image regardless of whether the image is an image for PDL printing, an image for copying, or a different type of image.

The format of the image data according to the present embodiment will be described with reference to FIG. 3. According to the present embodiment, as described above, data of a raster page image is divided into blocks of 32×32 pixels. In the description below, a block may also be called block image data. The block image data of 32×32 pixels is defined as tile data. Although data of a raster page image is divided into block image data of 32×32 pixels according to the present embodiment, the division of the image is not limited to such an example. After the tile data is generated, header data is added to the tile data. The header data includes various types of information which is used when the tile data is processed. Each processing unit performs processing by the data unit of the tile data with the header data. According to the present embodiment, the tile data with the header data is defined as packet data. The header data includes information such as a packet ID and a thumbnail value. According to the present embodiment, the header data further includes information of color space information, a tile data size, a compression flag, and a quantization ID for each piece of packet data. The packet ID is two-dimensional coordinate information of X and Y coordinates indicating the position of the tile in the packet data with respect to the raster image in page units. Color space information is information of an identifier indicating whether the tile is a RGB image, a YUV image, or a gray-scale image. The tile data size is information of the size of the image data of 1024 pixels included in the tile data. The tile data size is expressed in bytes. If the tile data in the packet data is compressed, the tile data size will be the data size of the compressed data. The compression flag is information of a flag indicating whether the tile data is data compressed by JPEG-DCT, data compressed by a different method, or uncompressed data. The quantization ID is information of the ID in a quantization table used when the JPEG-DCT compression has been performed. According to the present embodiment, the quantization ID is two-bit flag information. The thumbnail value is information of a mean value of the 1024 pixels in the tile data and generated by a thumbnail generation unit 205 described below.

The thumbnail generation unit 205 calculates a mean value of each of Y values, U values, and V values of the 1024 pixels in the packet data. Then the thumbnail generation unit 205 stores the mean values of the Y values, the U values, and the V values in blank fields of the thumbnail value. In other words, the thumbnail generation unit 205 stores a mean luminance value and mean color difference values.

An image compression unit 206 performs JPEG-DCT compression of the tile data in the packet data generated by the block image generation unit 204. Further, the image compression unit 206 stores the tile data size, the compression flag, and the quantization ID in the respective fields of the header data of the packet data. The packet data output from the image compression unit 206 is stored in the RAM 105 via the system bus 114. If the user expresses his/her intention to use a compression method other than the JPEG-DCT compression via the operation unit 102, the tile data will be compressed by a different compression method (e.g., JPEG 2000).

Figure 4:
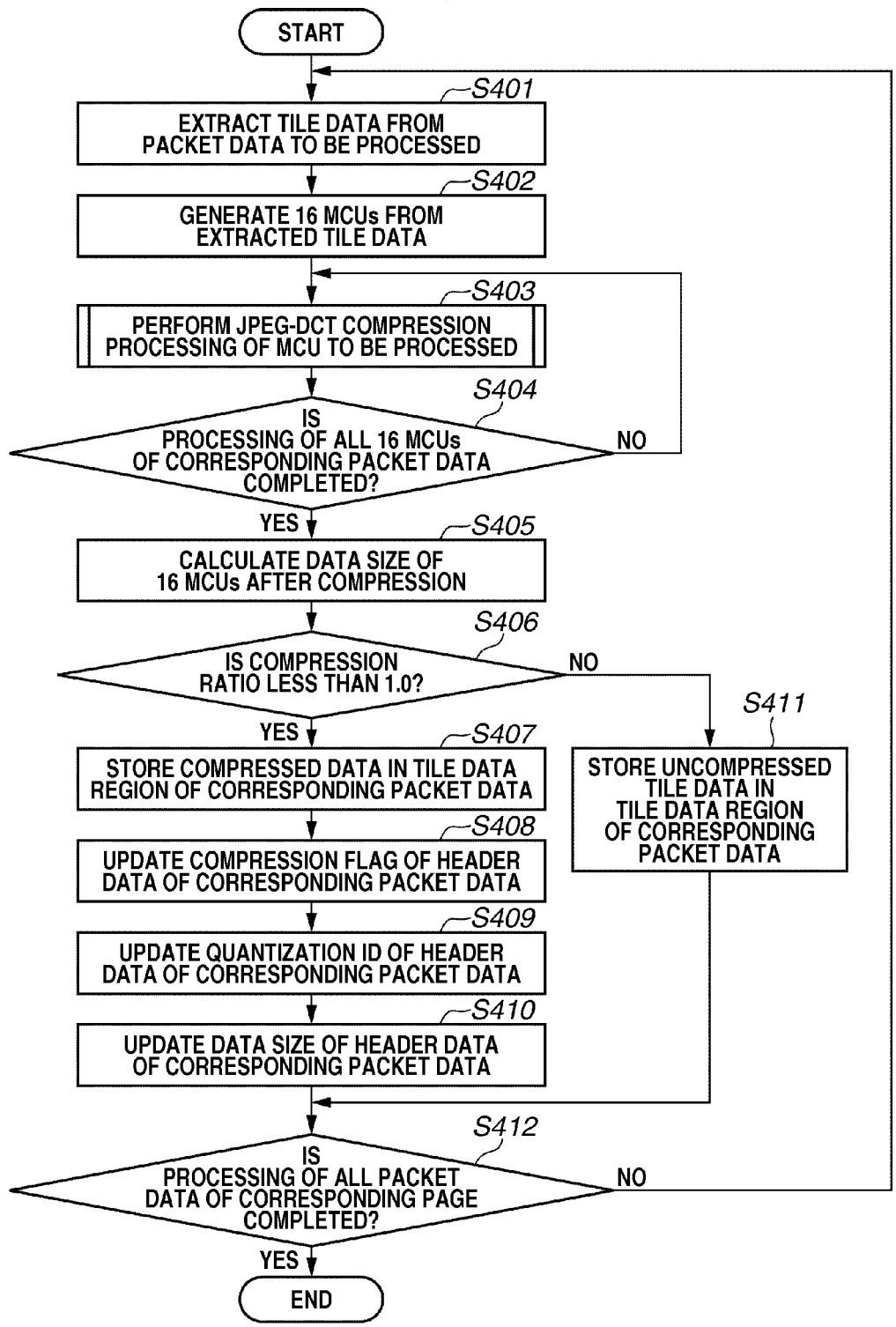
FIG. 4 is a flowchart illustrating processing flow of an image compression unit according to the exemplary embodiment of the present invention.

Next, the processing flow of the image compression unit 206 will be described with reference to FIG. 4. In step S401, the image compression unit 206 determines the packet data received from the thumbnail generation unit 205 as a processing object of the JPEG-DCT compression, and extracts tile data from the packet data. Since uncompressed tile data may be referenced in step S411 described below, a duplicate of the extracted tile data is also stored.

In step S402, the image compression unit 206 divides the extracted tile data into 16 MCUs. One MCU is a block of 8×8 pixels. As described above, since the tile data is a block of 32×32 pixels, the tile data corresponds to 16 MCUs. The generated MCUs are arranged in order in the main-scanning and sub-scanning directions having the upper left corner of the tile data as the point of origin, and the generated MCUs are configured in the order of numbers illustrated in FIG. 6. Further, the MCUs are processed in the numerical order of the MCU illustrated in FIG. 6. In step S403, the image compression unit 206 performs the JPEG-DCT compression of the MCU to be processed.

Figure 5:
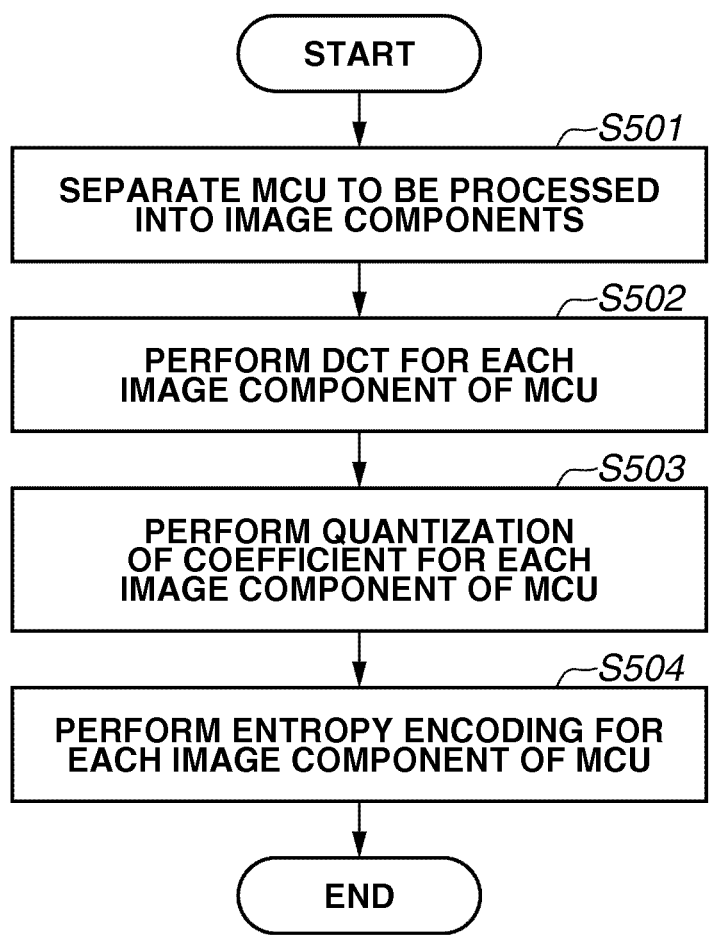
FIG. 5 is a flowchart illustrating joint photographic expert group discrete cosine transform (JPEG-DCT) compression processing of a minimum coded unit (MCU) according to the exemplary embodiment of the present invention.

Next, the processing flow of the JPEG-DCT compression to which the MCU is subjected will be described with reference to the flowchart in FIG. 5.

In step S501, the image compression unit 206 separates the MCU to be processed into image components. According to the present embodiment, since the YUV color space is used, the MCU is separated into three components Y, U, and V, and data for each image component is obtained.

In step S502, the image compression unit 206 performs DCT for each image component of the MCU. The DCT is used for obtaining a frequency component of data in 8×8. According to the DCT, coefficients of two-dimensional low frequency components to high frequency components can be calculated. In step S503, the image compression unit 206 quantizes each coefficient using a quantization table for each image component of the MCU after conversion processing by the DCT. As illustrated in FIG. 7, the quantization table includes a group of two-dimensional constants in an 8×8 matrix. Each constant determines a quantization step of the quantization processing.

In other words, if the constant of the quantization is increased, the data amount of the quantization result will be reduced but the quality of the image data will be deteriorated. Conversely, if the constant of the quantization is decreased, the data amount of the quantization result will be increased since the quantization step will be reduced, but the deterioration of the image quality of the image data can be prevented. Thus, as illustrated in FIG. 7, a plurality of quantization tables, which correspond to the data amount to be realized (i.e., the compression ratio) when the JPEG-DCT compression processing is performed, is generally provided. According to the present embodiment, the quantization step is increased as the table number increases from the quantization tables 1 to 4. In other words, when the quantization according to the quantization table 4 is performed, image data is deteriorated but a higher compression ratio is obtained. According to the present embodiment, the image compression unit 206 can set four quantization tables by the CPU 101. When the MFP 100 is started, all the four tables are set by the CPU 101. Further, the quantization tables are linked to the quantization IDs when they are managed. By the CPU 101 designating only the quantization ID, the image compression unit 206 can designate the quantization table to be used at the time of JPEG-DCT compression. The default setting of the quantization ID is 00 and the quantization table 1 illustrated in FIG. 7 will be used. If the quantization ID is 01, the quantization table 2 will be used. If the quantization ID is 10, the quantization table 3 will be used. If the quantization ID is 11, the quantization table 4 will be used. If the page image data processed by the image compression unit 206 cannot be stored in the region of the RAM 105 reserved by the CPU 101, the quantization ID is raised one level so that the compression ratio is increased. Then, the processing by the image compression unit 206 is performed again.

More precisely, the level of the quantization ID is raised one level, and all packet data in one page are subjected to the processing, and the processing illustrated in FIG. 4 is performed again for each piece of packet data. The packet data is the data input by the thumbnail generation unit 205 and not the packet data including the tile data which has been compressed by the processing illustrated in FIG. 4.

In step S504, the image compression unit 206 performs entropy encoding of each image component of the MCU while referencing the values of a Huffman table provided in advance. The entropy encoding compresses data by assigning codes of different lengths according to high/low data occurrence probability. The Huffman table used in the present embodiment is K3 to K6 described in JPEG ITU-T Rec.T.81. According to the above-described processing, JPEG-DCT compression of one MCU is completed.

In step S404, the image compression unit 206 determines whether the processing of all the 16 MCUs of the corresponding packet data is completed. If the processing of all the 16 MCUs of the corresponding packet data is not yet completed (NO in step S404), the processing returns to step S403, and the image compression unit 206 processes the next MCU. If the processing of all the 16 MCUs of the corresponding packet data is completed (YES in step S404), the processing proceeds to step S405. In step S405, the image compression unit 206 calculates a total data size of the 16 MCUs after the JPEG-DCT compression. In step S406, based on the data size obtained in step S405, the image compression unit 206 determines whether the compression ratio of the tile data of the corresponding packet data is less than 1.0. This determination processing is performed by determining the data size of the tile data in the uncompressed state (uncompressed data size) according to the color space information stored in the header of the corresponding packet data, and determining whether the data size of the MCU after the compression obtained in step S405 is less than the uncompressed data size. According to the present embodiment, since the color space information is YUV as described above, the size of the uncompressed data is 3K bytes. In other words, according to the present embodiment, whether the data size after the compression is less than 3K bytes is determined in step S406. The reason for the size of the uncompressed data being 3K bytes is based on the calculation of 32×32 pixels×1 byte (i.e., 0 to 255)×3 (Y, U, and V).

In step S406, if the compression ratio is less than 1.0 (YES in step S406), the processing proceeds to step S407. In step S407, the image compression unit 206 stores the data compressed by JPEG-DCT in the region of the tile data of the corresponding packet data. In step S408, the image compression unit 206 updates the compression flag in the header data of the corresponding packet data to a compression flag indicating that the data has been compressed by JPEG-DCT. In step S409, the image compression unit 206 updates the quantization ID in the header data of the corresponding packet data to a quantization ID which is used when the data is compressed by JPEG-DCT. In step S410, the image compression unit 206 updates the tile data size in the header data of the corresponding packet data to the tile data size calculated in step S405. On the other hand, in step S406, if the compression ratio is equal to or greater than 1.0 (NO in step S406), the processing proceeds to step S411. In step S411, the image compression unit 206 stores again the uncompressed tile data which has been stored for reference of the uncompressed tile data in step S401 in the tile data region of the corresponding packet data.

In step S412, the image compression unit 206 determines whether the processing of all the packet data of the corresponding page is completed. If the image compression unit 206 determines that the processing of all the packet data of the corresponding page is not yet completed (NO in step S412), the processing returns to step S401. Then, the image compression unit 206 performs the processing of the next packet data.

If the image compression unit 206 determines that the processing of all the packet data of the corresponding page is completed (YES in step S412), the compression processing of the corresponding page by the image compression unit 206 ends.

The above-described processing is performed by the image compression unit 206 in the scanned image processing unit 109. The processed image data is output to the system bus 114. Then, the image data is stored in the RAM 105.

Next, the calculation processing of the number of the color tiles in one page according to the present embodiment will be described with reference to FIG. 9. The processing flow is performed by the CPU 101 in a state where the image data of the page is output from the scanned image processing unit 109 and temporarily stored in the RAM 105.

In step S901, the CPU 101 acquires information of the thumbnail value in the header data of the packet data stored in the RAM 105. As described above, the thumbnail value is obtained by calculating a mean value of each of the pixel values (Y value, U value, and V value) of the 1024 pixels included in the tile data. In step S902, the CPU 101 determines whether each block is a color tile or a monochromatic tile based on the obtained thumbnail value. The CPU 101 uses a publicly known color/monochromatic determination technique for determining whether each pixel is color or monochromatic with the thumbnail value as a representative value of each tile data. In other words, a tile with a thumbnail value corresponding to a color pixel is determined as a color tile and a tile with a thumbnail value corresponding to a monochromatic pixel is determined as a monochromatic tile. If the color space information of the thumbnail value is YUV based on one luminance component (Y) and two color difference components (U and V), the color/monochromatic determination will be performed based on determination of whether each of the U and V values is within a predetermined range. If each of the U and V values is within the predetermined range, it is determined as a monochromatic pixel. If each of the U and V values is not within the predetermined range, it is determined as a color pixel. To be more precise, for example, if both the U and V values are equal to or greater than 110 and equal to or less than 140, the thumbnail value is determined as monochromatic. Although the predetermined range is equal to or greater than 110 and equal to or less than 140, a different range can be used.

In step S902, if the thumbnail value indicates a color tile (YES in step S902), the processing proceeds to step S909. In step S909, the CPU 101 increments the number of color tiles of the corresponding page. On the other hand, in step S902, if the thumbnail value does not indicate a color tile (NO in step S902), the tile is determined as a monochromatic tile and the processing proceeds to step S903. In step S903, the CPU 101 obtains the compression flag of the corresponding packet data from the RAM 105. The compression flag is, as described above, stored in the header data of the packet data. The compression flag indicates whether the tile data of the corresponding packet data is compressed/uncompressed and is used for the identification of the compression method. According to the present embodiment, the compression flag is a 4-bit code. In step S904, the CPU 101 determines whether the compression method of the tile data of the corresponding packet data is JPEG-DCT based on the obtained compression flag.

In step S904, if the compression method is determined as JPEG-DCT (YES in step S904), the processing proceeds to step S905. In step S905, the CPU 101 determines a color size determination threshold value used for the data size determination of the corresponding packet data (processing in step S907) according to the processing flow described below.

Figure 10:
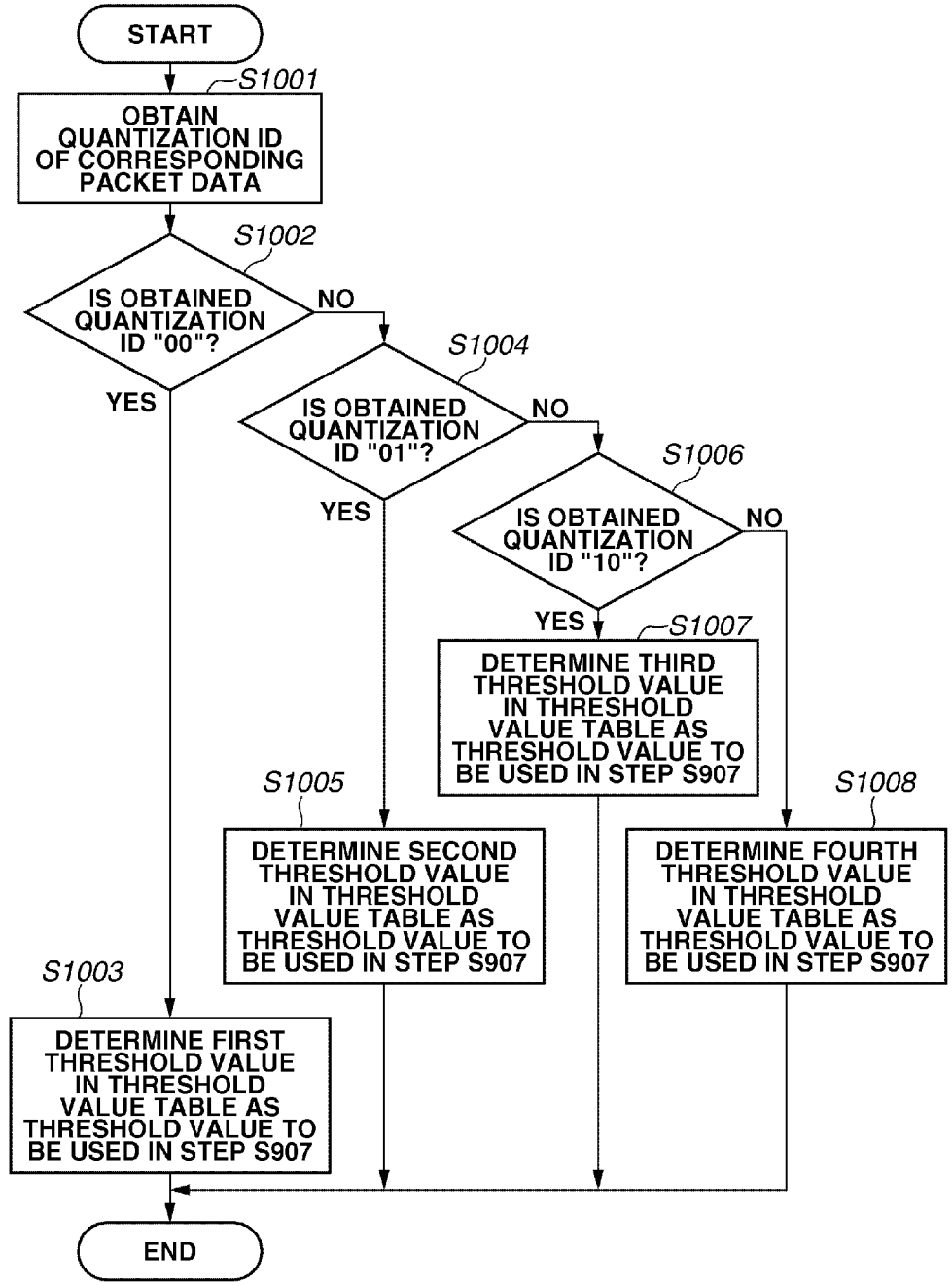
FIG. 10 is a flowchart illustrating processing used for determining the color size determination threshold value according to the exemplary embodiment of the present invention.

The flow of the processing used for determining the threshold value for color size determination will be described with reference to FIG. 10. In step S1001, the CPU 101 obtains the quantization ID of the corresponding packet data from the RAM 105. As described above, the quantization ID is stored in the header data of the packet data. The quantization ID is used for identifying the quantization table which has been used when the tile data has been compressed by JPEG-DCT. According to the present embodiment, as described above, the quantization ID is a 2-bit flag. In step S1002, the CPU 101 determines whether the obtained quantization ID (2-bit flag) is "00". If the quantization ID is determined as "00" (YES in step S1002), the processing proceeds to step S1003. In step S1003, the CPU 101 determines "235" as the color size determination threshold value. "235" is the threshold value stored in a first block of the color size determination threshold value table generated in advance and illustrated in FIG. 8. The color size determination threshold value will be described in detail. The color size determination threshold value is a value of a tile data size which is obtained when particular tile data is compressed by use of a quantization table which is used when tile data of each piece of packet data is compressed by the image compression unit 206.

The above-described particular tile data includes black (R: 0, G: 0, B: 0) pixels and white (R: 255, G: 255, B: 255) pixels arranged in a staggered manner. Such tile data is the largest monochromatic tile data in data size. A data size obtained by performing JPEG-DCT compression using a parameter similar to the one which is used when the above-described particular tile data is subjected to JPEG-DCT compression by the image compression unit 206 is the color tile size determination threshold value and is illustrated in FIG. 8. The parameter used in the present embodiment is the quantization table illustrated in FIG. 7. The threshold value in FIG. 8 is expressed in bytes. The color tile size determination threshold value is not necessarily determined in this manner. Further, instead of comparing the data size of all YUV (data size of Y+data size of U+data size of V) with the color tile size determination threshold value, the data size of UV data (data size of U+data size of V) may be compared with the color tile size determination threshold value. If the data size is compared in such a manner, a color tile size determination threshold value less than the value described above will be used.

Since the size of the tile data subjected to JPEG-DCT compression includes various markers determined by the JPEG standards, the color tile size determination threshold value needs to be adjusted to the system to be used. Further, as illustrated in FIG. 8, all cases of the quantization table used by the image compression unit 206 are calculated and associated with quantization IDs. According to the present embodiment, although the color space is YUV when the compressing by the image compression unit 206 is performed, if a plurality of color spaces exist when the compressing is performed, a color tile size determination threshold value needs to be generated for each color space. The value generated and configured as described above is the color size determination threshold value.

In step S1002, if the quantization ID is determined as not "00" (NO in step S1002), the processing proceeds to step S1004. In step S1004, the CPU 101 determines whether the obtained quantization ID is "01". If the quantization ID is determined as "01" (YES in step S1004), the processing proceeds to step S1005. In step S1005, the CPU 101 determines the threshold value stored in a second block of the color size determination threshold value table as the color size determination threshold value. On the other hand, if the CPU 101 determines that the quantization ID is not "01" (NO in step S1004), the processing proceeds to step S1006. In step S1006, the CPU 101 determines whether the obtained quantization ID is "10". If the CPU 101 determines that the quantization ID is "10" (YES in step S1006), the processing proceeds to step S1007. In step S1007, the CPU 101 determines the threshold value stored in a third block of the color size determination threshold value table as the color size determination threshold value. If the CPU 101 determines that the quantization ID is not "10" (NO in step S1006), the processing proceeds to step S1008. In step S1008, since the quantization ID is determined as "11, the CPU 101 determines the threshold value stored in a fourth block of the color size determination threshold value table as the color size determination threshold value. As described above, the color size determination threshold value used in step S905 for the determination of the data size of the corresponding packet data is determined. Although four quantization tables are used according to the present embodiment, the number of the quantization tables is not limited to four.

In step S906, the CPU 101 obtains a tile data size of the corresponding packet data from the RAM 105. In step S907, the CPU 101 determines whether the tile data size is equal to or greater than the color size determination threshold value. If the tile data size of the corresponding packet data is equal to or greater than the color size determination threshold value (YES in step S907), the CPU 101 determines that the tile in the corresponding packet data is a color tile, and the processing proceeds to S909. In step S909, the CPU 101 increments the number of color tiles of the corresponding page. In this manner, the CPU 101 counts the number of color tiles in the corresponding page. On the other hand, in step S907, if the tile data size of the corresponding packet data is determined as less than the color size determination threshold value (NO in step S907), the CPU 101 determines that the tile in the corresponding packet data is a monochromatic tile, and the processing proceeds to step S910. In step S910, the CPU 101 determines whether the determination processing of all the packet data of the corresponding page is completed.

In step S904, if the compression method is determined as not JPEG-DCT (NO in step S904), the processing proceeds to step S908. In step S908, the CPU 101 further determines whether the corresponding packet data is uncompressed based on the compression flag. If the packet data is determined as uncompressed (YES in step S908), the CPU 101 determines that the tile in the corresponding packet data is a color tile, and the processing proceeds to step S909. In step S909, the CPU 101 increments the number of color tiles of the corresponding page. According to the image forming apparatus of the present embodiment, if the compression ratio used by the image compression unit 206 is equal to or greater than 1.0, the uncompressed tile data will be stored in the packet data as described above. In such a case, the data size of the corresponding page is assumed to be large. Further, the data size is assumed to be large due to the corresponding page being a color page. Thus, the processing in step S909 is performed. If the corresponding page is assumed to be a color page as described above, the processing from steps S902 to S909 is not necessarily repeated for each packet. Then, the CPU may determine all the packet data as color tiles, and the processing can proceed to step S910. In step S908, if the CPU 101 determines that the corresponding packet data is not uncompressed (NO in step S908), the CPU 101 determines that the tile included in the corresponding packet data is a monochromatic tile, and the processing proceeds to step S910. In step S910, the CPU 101 determines whether the determination processing of all the packet data of the corresponding page is completed.

In step S910, if the CPU 101 determines that the determination processing of all the packet data of the corresponding page is completed (YES in step S910), the calculation processing of the number of color tiles of the corresponding page ends. In step S910, if the determination processing of all the packet data of the corresponding page is not completed yet (NO in step S910), the processing returns to S901. Then, the color/monochromatic determination processing of the next packet data will be performed.

According to the above-described processing, the CPU 101 calculates the number of color tiles in one page and calculates a color pixel ratio of the corresponding page. The color pixel ratio can be calculated from the number of color tiles. For example, a ratio of a value obtained by calculating "a product of the number of pixels in one tile and the number of color tiles" to "all the pixels in one page".

In addition to the processing of the flowchart in FIG. 9, the processing below may also be performed. The CPU 101 may perform determination processing for the fee to be charged to the user of the image forming apparatus for the printing of the corresponding page according to the calculated color pixel ratio. For example, if the color pixel ratio is equal to or greater than a first threshold value (10%), the user may be charged 40 yen for the printing of the corresponding page. Further, if the color pixel ratio is less than the first threshold value but equal to or greater than a second threshold value (e.g., 0.1%), the user may be charged 20 yen. Furthermore, if the color pixel ratio is less than the second threshold value, the user may be charged 10 yen. The copy fee may be charged based on a two-stage rate system without using the first threshold value. For example, the user may be charged 40 yen if the color pixel ratio is equal to or greater than the second threshold value and 10 yen if the color pixel ratio is less than the second threshold value. The copy fee may also be charged based on a four- or more stage rate system.

Further, the CPU 101 may instruct the print image processing unit 108 to convert YUV image data into CMYK image data if the color pixel ratio is equal to or greater than the second threshold value (i.e., 40 yen or 20 yen, the print image is determined as color). Further, the CPU 101 may instruct the print image processing unit 108 to convert YUV image data into K monochromatic image data if the color pixel ratio is less than the second threshold value (i.e., 10 yen, the print image is determined as monochromatic). In that case, color conversion parameters used for color conversion processing of YUV image data to CMYK image data and color conversion parameters used for color conversion processing of YUV image data to K monochromatic image data need to be stored in advance in the print image processing unit 108.

According to the calculation processing of the number of color tiles of the present embodiment, the color/monochromatic determination based on the thumbnail value is performed in advance. However, the color/monochromatic determination using the compression flag and the tile data size can be performed in advance without the color/monochromatic determination based on the thumbnail value.

As described above, according to the present embodiment, one page is divided into tile data, and then the number of color tiles in one page is calculated based on the thumbnail value of each piece of tile data, the compression method of each piece of tile data, and the information of the tile data size. In this manner, the tile not being correctly determined as a color tile by the conventional method using the color/monochromatic determination based only on the thumbnail value can be correctly determined as a color tile. Thus, by using the method described in the present embodiment, the number of color tiles can be calculated furthermore accurately and the accuracy of the charges made to users of the image forming apparatus can be maintained.

Although the JPEG-DCT compression is used in the description in the above-described exemplary embodiment, there are other compression methods with poor compression efficiency of color images compared to that of monochromatic images (i.e., image data size after compression is large). They are, for example, JPEG 2000 compression and run length compression. Thus, the JPEG-DCT compression of the above-described exemplary embodiment is an example of a compression method having "poor compression efficiency of color image compared to that of monochromatic image" when an image is compressed.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present embodiment, accuracy of color/monochromatic determination can be improved in an image in which the mean color difference becomes close to the color difference of a gray axis with mixture of pixels of a certain color and a complementary color.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-250182 filed Nov. 14, 2012, which is hereby incorporated by reference herein in its entirety.

What is claimed is:

1. An apparatus comprising:
 a compression unit configured to compress an image by performing quantization processing using a quantization table and encoding processing on the image, and
 a determination unit configured to determine whether the image before the compression is color or monochromatic based on a data size of the image after the compression and a mean color difference value of the image before the compression,
 wherein the determination unit determines the image before the compression is color if the mean color difference value of the image before the compression is equal to or less than a predetermined value and the data size of the image after the compression is equal to or more than a predetermined data amount.

2. The apparatus according to claim 1, further comprising a dividing unit configured to divide an input image into a plurality of blocks,
 wherein the image before the compression is one block out of the plurality of blocks obtained by the dividing unit.

3. The apparatus according to claim 2, wherein the determination unit performs the determination for each of the plurality of blocks.

4. The apparatus according to claim 3, further comprising a unit configured to determine that the input image is a color image if a number of blocks determined by the determination unit as color is equal to or greater than a threshold value.

5. The apparatus according to claim 1, wherein the data size of the image after the compression is a size of data of color difference of the image after the compression.

6. The apparatus according to claim 1, wherein the determination unit determines that the image before the compression is a monochromatic image if the mean color difference value of the image before the compression is equal to or less than the predetermined value and the data size of the image after the compression is less than the predetermined data amount.

7. A method comprising:
 compressing an image by performing quantization processing using a quantization table and encoding processing on the image, and
 determining whether the image before the compression is color or monochromatic based on a data size of the image after the compression and a mean color difference value of the image before the compression,
 wherein the determining step determines the image before the compression is color if the mean color difference value of the image before the compression is equal to or less than a predetermined value and the data size of the image after the compression is equal to or more than a predetermined data amount.

8. The method according to claim 7, further comprising dividing an input image into a plurality of blocks,
 wherein the image before the compression is one block out of the plurality of blocks obtained by the division.

9. The method according to claim 8, further comprising performing the determination for each of the plurality of blocks.

10. The method according to claim 9, further comprising determining that the input image is a color image if a number of blocks determined by the determination as color is equal to or greater than a threshold value.

11. The method according to claim 7, wherein the data size of the image after the compression is a size of data of color difference of the image after the compression.

12. The method according to claim 7, further comprising:
 determining that the image before the compression is a monochromatic image if the mean color difference value of the image before the compression is equal to or less than the predetermined value and the data size of the image after the compression is less than the predetermined data amount.

13. A non-transitory computer-readable storage medium storing a program that causes a computer to perform the method according to claim 12.

* * * * *